(12) United States Patent
Kawano

(10) Patent No.: US 9,030,821 B2
(45) Date of Patent: May 12, 2015

(54) ELECTRONIC DEVICE

(75) Inventor: Akinobu Kawano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 126 days.

(21) Appl. No.: 13/568,176

(22) Filed: Aug. 7, 2012

(65) Prior Publication Data

US 2012/0300393 A1 Nov. 29, 2012

Related U.S. Application Data

(63) Continuation of application No. PCT/JP2010/052264, filed on Feb. 16, 2010.

(51) Int. Cl.
*H05K 7/20* (2006.01)
*G06F 1/20* (2006.01)

(52) U.S. Cl.
CPC ........................... *G06F 1/203* (2013.01)
USPC ............ 361/697; 361/679.49; 361/679.51; 361/692; 361/695; 361/703; 165/80.3

(58) Field of Classification Search
USPC ............ 361/676–678, 679.46–679.54, 361/688–722, 752, 831
See application file for complete search history.

(56) References Cited

U.S. PATENT DOCUMENTS

| | | | |
|---|---|---|---|
| 6,377,453 B1 | 4/2002 | Belady | |
| 2007/0131383 A1 | 6/2007 | Hattori et al. | |

FOREIGN PATENT DOCUMENTS

| | | |
|---|---|---|
| CN | 1984553 | 6/2007 |
| CN | 101193538 | 6/2008 |
| JP | 2001-83631 | 3/2001 |
| JP | 2001-332674 | 11/2001 |
| JP | 2007-189183 | 7/2007 |
| JP | 2008-72076 | 3/2008 |
| JP | 2008-159925 | 7/2008 |
| JP | 2008-234346 | 10/2008 |
| JP | 2009-163623 | 7/2009 |

OTHER PUBLICATIONS

Patent Abstracts of Japan, Publication No. 2007-189183, Published Jul. 26, 2007.
Patent Abstracts of Japan, Publication No. 2001-332674, Published Nov. 30, 2001.
Patent Abstracts of Japan, Publication No. 2008-234346, Published Oct. 2, 2008.

(Continued)

*Primary Examiner* — Courtney Smith
(74) *Attorney, Agent, or Firm* — Staas & Halsey LLP

(57) ABSTRACT

An electronic device includes a case having an exhaust vent, an electronic component, a radiation component including radiation fins adjacent to the exhaust vent and formed of first plates disposed parallel to one another to form first air channels, the radiation component radiating the heat received from the electronic component to air passing through the first air channels, a fan disposed at a position having a space from the radiation fins to send air toward the radiation fins, a dust filter including second plates disposed parallel to one another to form second air channels and disposed in the space between the radiation fins and the fan to transfer the air to the radiation fins while capturing dust. The dust filter is removable and the second plates have a shape to be inserted in the first air channels so as to push the dust out of the first air channels.

8 Claims, 9 Drawing Sheets

(56) References Cited

OTHER PUBLICATIONS

Patent Abstracts of Japan, Publication No. 2008-072076, Published Mar. 27, 2008.
Patent Abstracts of Japan, Publication No. 2009-163623, Published Jul. 23, 2009.
Patent Abstracts of Japan, Publication No. 2008-159925, Published Jul. 10, 2008.
Patent Abstracts of Japan, Publication No. 2001-083631, Published Mar. 30, 2001.
International Search Report of PCT/JP2010/052264 mailed May 18, 2010.
Espacenet Abstract, Publication No. 101193538, Published Jun. 4, 2008.
Chinese Office Action issued Jul. 1, 2014 in corresponding Chinese Application No. 201080063825.8.
Chinese Office Action mailed on Febraury 11, 2015 in corresponding Chinese Patent Application No. 201080063825.8.

ELECTRONIC DEVICE

CROSS-REFERENCE TO RELATED APPLICATIONS

The present application is a U.S. continuation application filed under 35 USC 111(a) claiming benefit under 35 U.S.C. 120 and 365(c) of PCT International Application No. PCT/JP2010/052264 filed on Feb. 16, 2010, the entire contents of which are incorporated herein by reference.

FIELD

The disclosures herein relate to an electronic device having an air-cooling fan and a heat radiation component.

BACKGROUND

In electronic devices, there are some types of electronic devices that contain an air-cooling fan such as a notebook-type personal computer (hereinafter abbreviated as a "note PC"). The note PC generally includes exhaust vents on the sides or on the rear surface of its case and radiation fins disposed immediately inside of the exhaust vents. The note PC contains a heat generating electronic component such as a CPU LSI. In such a note PC, heat generated by the heat generating electronic component is transferred to the radiation fins. The note PC further includes a fan inside its case so as to send air toward the radiation fins. The air sent from the fan takes heat away from the radiation fins while traveling through the radiation fins, and is then discharged from the exhaust vents to the outside of the case.

Note that one of the considerations that an air cooling system of the note PC has may be dust control. The air sent from the fan contains dust acquired while traveling various routs. Hence, such dust may partially accumulate around air inlets of the radiation fins or inside the radiation fins without passing through the radiation fins. As such dust accumulation continues, air channels may be narrowed to lower heat radiation efficiency. The lowered heat radiation efficiency may result in an increase in temperature inside the case, which may degrade electronic components inside the case to induce breakdown of the device. There is proposed a configuration to overcome the aforementioned outcome. In this proposed configuration, space is provided between the radiation fins and the fan, and an opening is formed in the case to communicate with the space between the radiation fins and the fan. Further, a cover is disposed in the opening of the case in a normal status whereas the cover is removed in a cleaning status so as to eliminate the dust accumulated around the inlets of the radiation fins. Further, there is proposed another configuration in which a dust filer for capturing dust is disposed between the radiation fins and the fan. Moreover, there is proposed still another configuration in which the dust filter includes projections disposed slightly inside the inlets of the radiation fins. In this configuration, dust that has entered slightly inside the inlets of the radiation fins may be eliminated in addition to the dust captured by the dust filter.

However, when an electronic device includes a dust filter capable of reliably capturing the dust, the disposed dust filter itself may serve as the resistance to thereby inhibit the air from flowing. As a result, the heat radiation efficiency may be lowered. Meanwhile, even if the dust filter has reduced resistance, long-term use of the device may result in accumulation of the dust around the inlets of the radiation fins or inside the radiation fins. With the aforementioned proposed configurations, it may be possible to eliminate the dust accumulated around the inlets of the radiations fins; however, it may be difficult to eliminate the dust accumulated inside the radiation fins. The dust may not accumulate so much inside the radiation fins compared to the dust accumulated around the inlets of the radiations fins. However, dust may accumulate inside the radiation fins due to the long-term use of the note PC in some usage environment of the note PC.

In addition, there is proposed another configuration that includes a brush for cleaning the inside of the radiation fins. Note that the aforementioned brush is effective in cleaning of the radiation fins but is not effective in inhibiting the dust from accumulating.

RELATED ART DOCUMENT

Patent Documents

PATENT DOCUMENT 1: Japanese Laid-open Patent Publication No. 2008-072076
PATENT DOCUMENT 2: Japanese Laid-open Patent Publication No. 2008-234346
PATENT DOCUMENT 3: Japanese Laid-open Patent Publication No. 2008-159925
PATENT DOCUMENT 4: Japanese Laid-open Patent Publication No. 2009-163623
PATENT DOCUMENT 5: Japanese Laid-open Patent Publication No. 2001-83631

SUMMARY

According to an aspect of an embodiment, there is provided an electronic device that includes a case having an exhaust vent; an electronic component disposed inside the case; a radiation component including radiation fins that are disposed at a position adjacent to the exhaust vent inside the case and that are formed of first plates disposed parallel to one another so as to form first air channels partitioned by the first plates, the radiation component being configured to receive heat of the electronic component and radiate the received heat to air passing through the first air channels of the radiation fins; a fan disposed at a position having a space from the radiation fins inside the case, the fan being configured to send air toward the radiation fins; a dust filter including second plates disposed parallel to one another so as to form second air channels partitioned by the second plates and disposed in the space between the radiation fins and the fan, the dust filter being configured to transfer the air sent from the fan to the radiation fins while capturing dust contained in the transferred air. In the electronic device, the dust filter disposed in the space is removable from the space, and the second plates of the dust filter have a shape to be inserted in the first air channels such that the second plates push the dust accumulated in the first air channels out of the first air channels.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

Other objects, features, and advantages of the present invention will become more apparent from the following detailed description when read in conjunction with the accompanying drawings.

BRIEF DESCRIPTION OF DRAWINGS

FIGS. 6A to 6F illustrate diagrams of the dust filter viewed from different directions, in which FIG. 6A is a left side diagram, FIG. 6B is a front diagram, FIG. 6C is a plan diagram, FIG. 6D is a rear diagram, FIG. 6E is a bottom diagram and FIG. 6F is a right side diagram;

DESCRIPTION OF EMBODIMENTS

Figure 1:
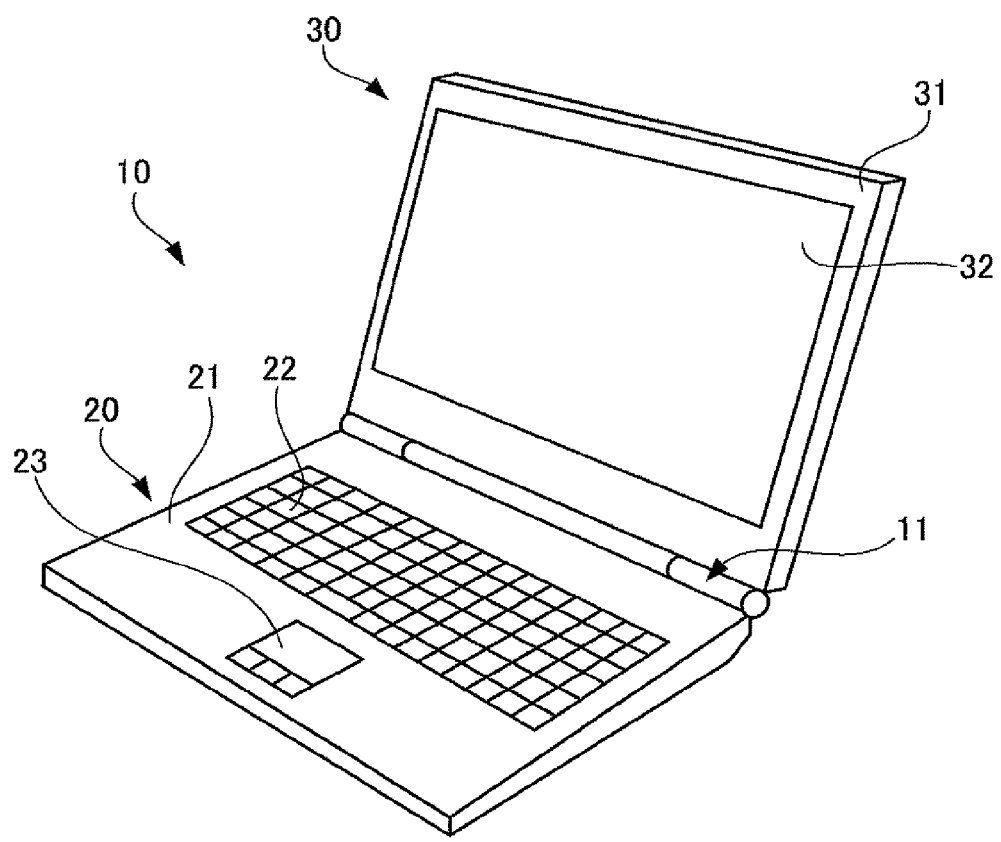
FIG. 1 is an appearance perspective diagram illustrating an example of a note PC as an electronic device according to an embodiment.

In the following, embodiments will be described. FIG. 1 is an appearance perspective diagram illustrating an example of a note PC as an electronic device according to an embodiment. A note PC 10 illustrated in FIG. 1 includes a main body unit 20 and a display unit 30. The main body unit 20 includes a CPU, a hard disk drive (hereinafter abbreviated as an "HDD") and the like inside a case 21 as well as including a keyboard 22 and a touch panel 23 that is a kind of a pointing device on a top face of the case 21. The display unit 30 is coupled to the main body unit 20 via a hinge 11 such that the display unit 30 is opened or closed with respect to the main body unit 20. The display unit 30 in an open state includes a display screen 32 on its front surface.

Figure 2:
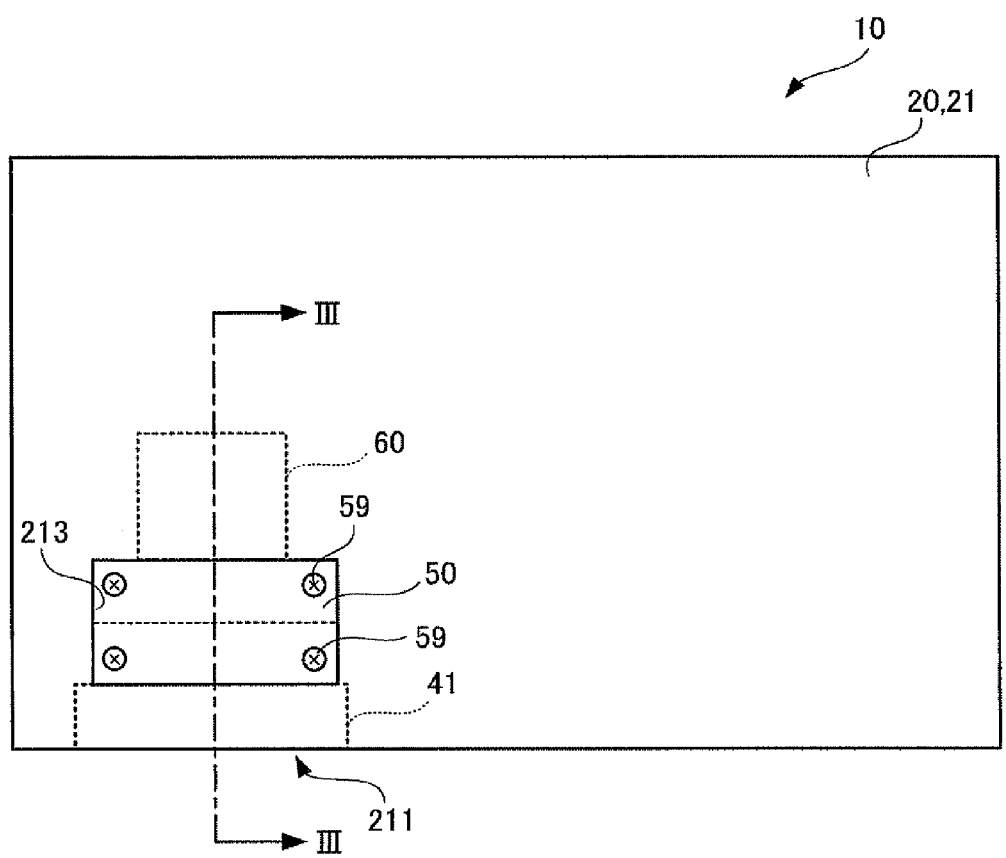
FIG. 2 is a schematic diagram illustrating a bottom face of a main body unit of the note PC illustrated in FIG. 1.
Figure 3:
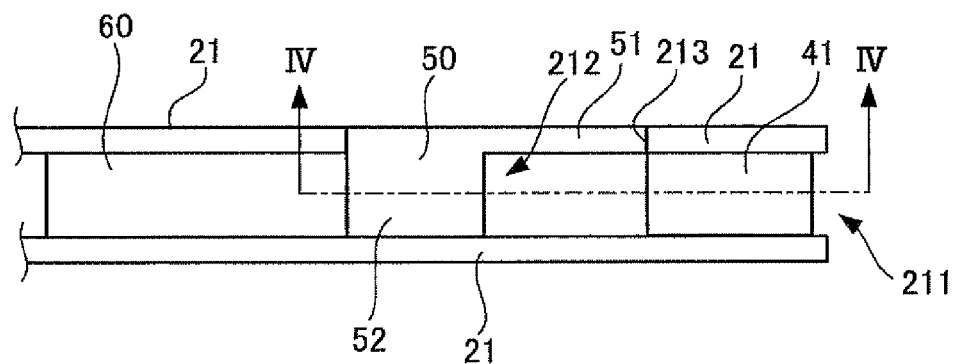
FIG. 3 is a cross sectional diagram taken along III-III dashed-dotted arrows of FIG. 2.
Figure 4:
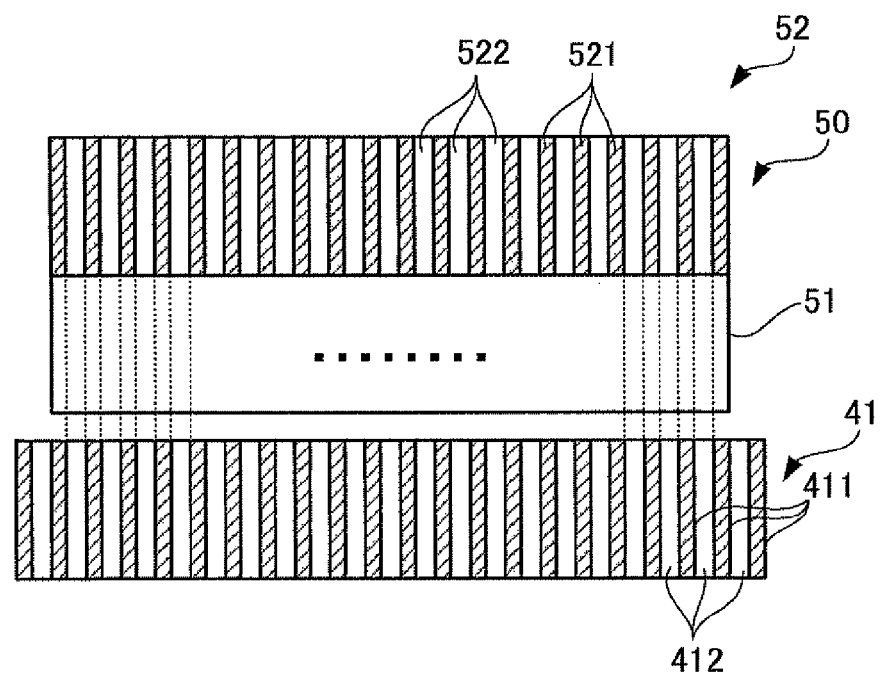
FIG. 4 is a cross sectional diagram taken along IV-IV dashed-dotted arrows of FIG. 3 of radiation fins and a dust filter.
Figure 5:
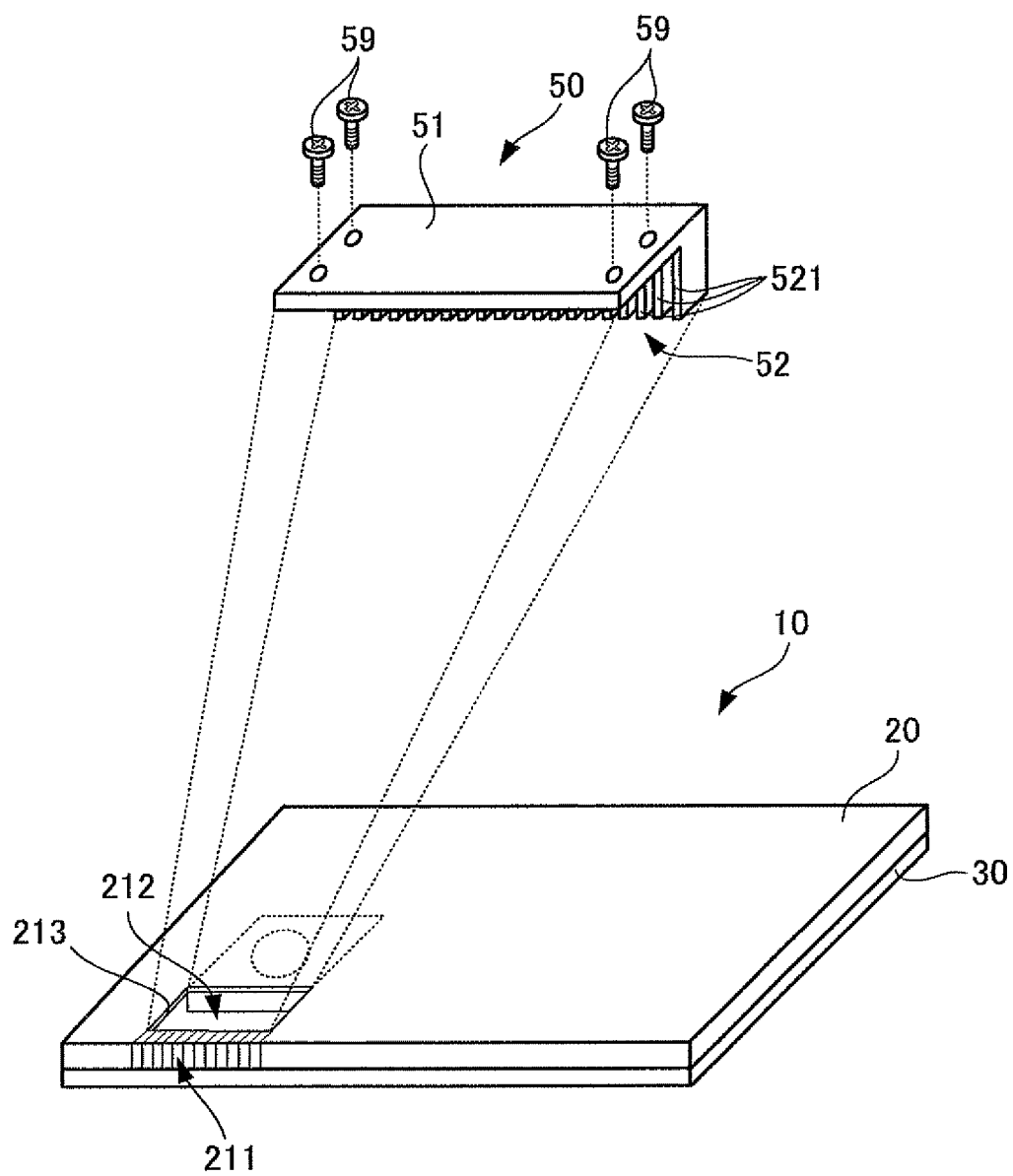
FIG. 5 is an exploded perspective diagram illustrating the dust filter removed from the note PC.
Figure 6B:
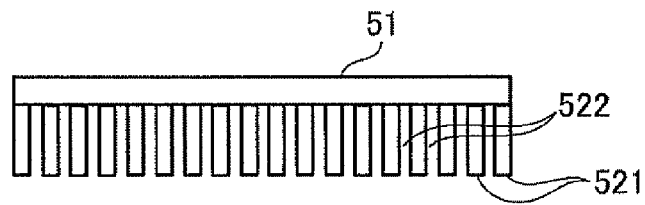
Figure 6A:
Figure 6C:
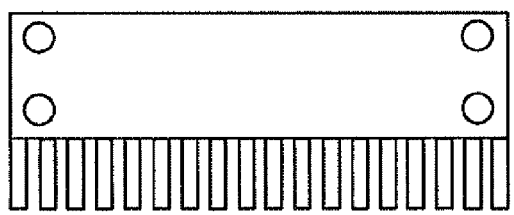
Figure 6F:
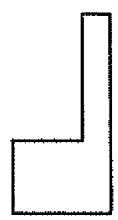
Figure 6D:
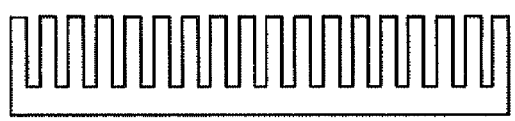
Figure 6E:

FIG. 2 is a schematic diagram illustrating a bottom face of the main body unit 20 of the note PC 10 illustrated in FIG. 1. FIG. 3 is a cross sectional diagram taken along III-III dashed-dotted arrows of FIG. 2. FIG. 4 is a cross sectional diagram taken along IV-IV dashed-dotted arrows of FIG. 3 of radiation fins and a dust filter. FIG. 5 is an exploded perspective diagram illustrating the dust filter being removed from the note PC. FIGS. 6A to 6F illustrate diagrams of the dust filter viewed from different directions, in which FIG. 6A is a left side diagram, FIG. 6B is a front diagram, FIG. 6C is a plan diagram, FIG. 6D is a rear diagram, FIG. 6E is a bottom diagram and FIG. 6F is aright side diagram. In FIG. 6, (A) is a left side diagram, (B) is a front diagram, (C) is a plan diagram, (D) is a rear diagram, (E) is a bottom diagram and (F) is a right side diagram.

The main body unit 20 includes an exhaust vent 211 (see FIG. 3 and the later-described FIG. 5) in a rear surface that is the hinge 11 side surface of the case 21 (the hinge 11 is illustrated in FIG. 1 but not illustrated in FIG. 2 onward).

The radiation fins 41 are located at a position adjacent to the exhaust vent 211 inside the case 21. As illustrated in FIG. 4, the radiation fins 41 includes plates 411 disposed parallel to one another so as to form pectinate air channels 412 partitioned by the plates 411. The radiation fins 41 are configured to radiate heat received from the later-described heat generating electronic component 711 (see FIG. 7).

A fan 60 is disposed at a position having a space 212 (see FIG. 5) from the radiation fins 41 inside the case 21. The fan 60 is configured to send air toward the radiation fins 41.

A dust filter 50 is disposed within the space 212 between the radiation fins 41 and the fan 60. An opening 213 communicating with the space 212 is formed in a bottom face of the case 21. The dust filter 50 includes a cover part 51 to block the opening 213. The dust filter 50 further includes a filter part 52. The filter part 52 includes plates 521 disposed parallel to one another so as to form pectinate air channels 522 partitioned by the plates 521 in a manner similar to the arrangement of the radiation fins 41. The filter part 52 is configured to transfer the air sent from the fan 60 to the radiation fins 41 while capturing dust contained in the transferred air. As illustrated in FIG. 4, the plates 521 and the air channels 522 of the dust filter 50 are aligned with the plates 411 and the air channels 412 of the radiation fins 41 with respect to an airflow direction from the fan 60. The dust filter 50 covers the opening 213 by being fixed with screws 59. As illustrated in FIG. 5, the dust filter 50 may be removed by unscrewing the screws 59.

Figure 7:
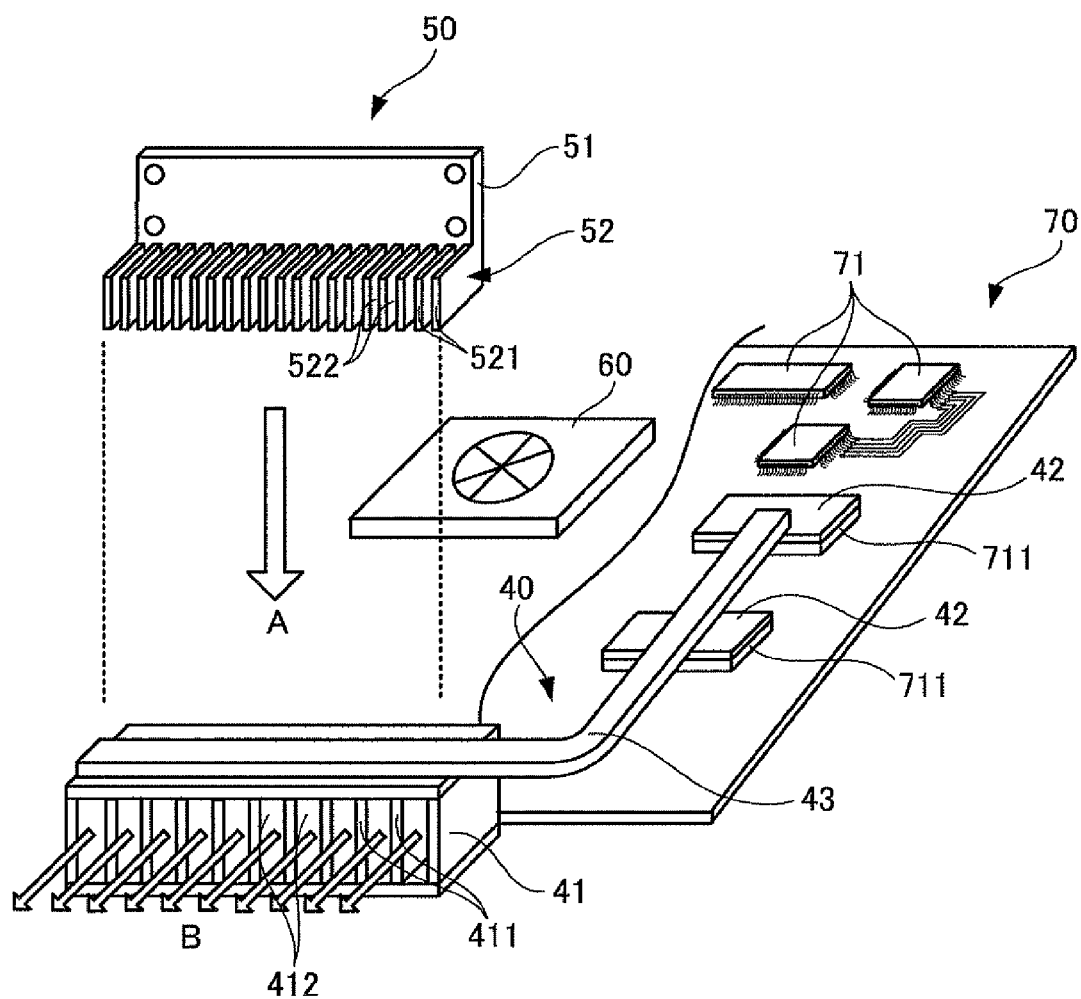
FIG. 7 is a diagram illustrating an outline of an internal structure within a case of a main body unit of the note PC and a process of cleaning the radiation fins utilizing the dust filter.

FIG. 7 is a diagram illustrating an outline of an internal structure within the case 21 of the main body unit 20 of the note PC 10 and a process of cleaning the radiation fins 41 utilizing the dust filter 50.

The case 21 (see FIGS. 1, 2, etc.) contains a circuit board 70, and the circuit board 70 includes plural electronic components 71 including two heat generating electronic components 711 that need to be forcibly cooled. One of the two heat generating electronic components 711 is a CPU LSI having a central processing unit (CPU) serving as an arithmetic function by execution of a program.

Two heat receiving plates 42 are in contact with the two heat generating electronic components 711 forming a radiation component 40 so as to remove heat from the heat generating electronic components 711. The two heat receiving plates 42 and the radiation fins 41 are connected via a heat pipe 43 such that the heat received by the heat receiving plates 42 is transferred to the radiation fins 41 via the heat pipe 43. The heat pipe 43 and the radiation fins 41 are elements that form the radiation component 40. The air sent from the fan 60 passes through the air channels 522 between the plates 521 of the filter part 52 in the dust filter 50, and further passes through the air channels 412 between the plates 411 of the radiation fins 41 to receive heat from the radiation fins 41. The air having received heat from the radiation fins 41 is then discharged from the exhaust vent 211 to the outside of the case 21.

Note that as mentioned earlier, the dust filter 50 may be removed from the case 21 as illustrated in FIG. 5. The dust captured by the dust filter 50 and accumulated in the dust filter 50 is eliminated by removing the dust filter 50 from the case 21 and subsequently cleaning the dust filter 50.

Further, the dust filter 50 is temporarily removed from the case. An orientation of the dust filter 50 is changed as illustrated in FIG. 7 and the dust filter 50 is then inserted in the space 212 again from the opening 213 (see FIG. 5) of the case 21 as indicated by an arrow A. Thereafter, the dust filter 50 is moved in a direction indicated by an arrow B such that the plates 521 of the dust filter 50 are inserted into the air channels 412 of the radiation fins 41. Accordingly, dust accumulated in the air channels 412 of the radiation fins 41 is pushed out of the radiation fins 41 in the direction indicated by the arrow B.

Thus, according to this embodiment, the dust filter 50 may be utilized as the name of the dust filter indicates in a normal usage status and the dust accumulated inside the radiation fins 41 is optionally eliminated by utilizing the dust filter 50.

Next, modifications of the aforementioned embodiment are described.

Figure 8:
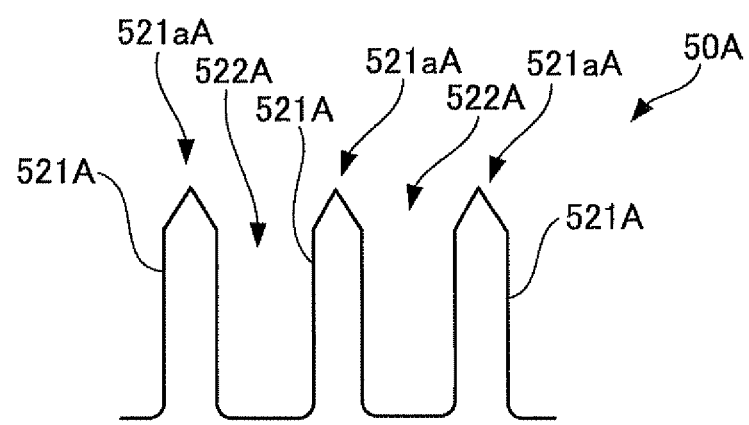
FIG. 8 is a diagram illustrating a part of a dust filter according to first modification.

FIG. 8 is a diagram illustrating a part of a dust filter according to first modification. In order to indicate that the diagram of FIG. 1 illustrates the first modification of the aforementioned embodiment, same reference numerals used in the embodiment are provided with a suffix "A" in FIG. 8.

Plates 521A forming a dust filter 50A according to the first modification, a part of which is illustrated in FIG. 8, are formed such that thicknesses of the plates 521A gradually become thinner toward pointed ends 521aA of the plates 521A to be inserted into air channels of radiation fins (identical to the radiation fins 41 according to the aforementioned embodiment).

The plates 521A of the dust filter 50A having such a shape may be easier to be inserted in the air channels of the radiation fins such that the plates 521A push out the dust accumulated inside the radiation fins as described with reference to FIG. 7, which may result in an improvement in workability.

Figure 10:
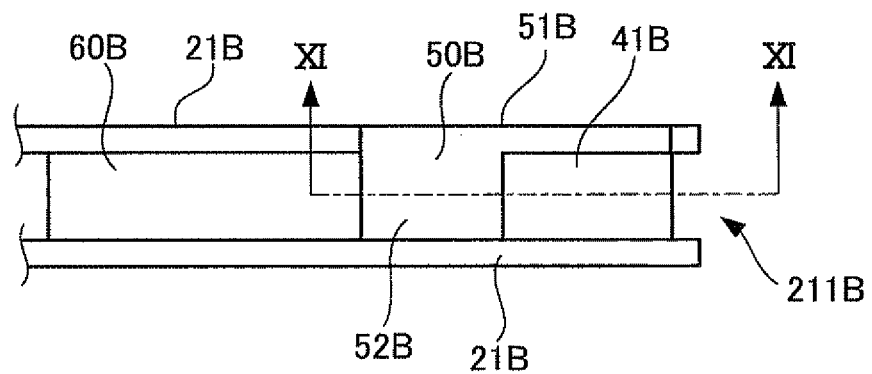
FIG. 10 is a cross sectional diagram taken along X-X dashed-dotted arrows of FIG. 9.
Figure 11:
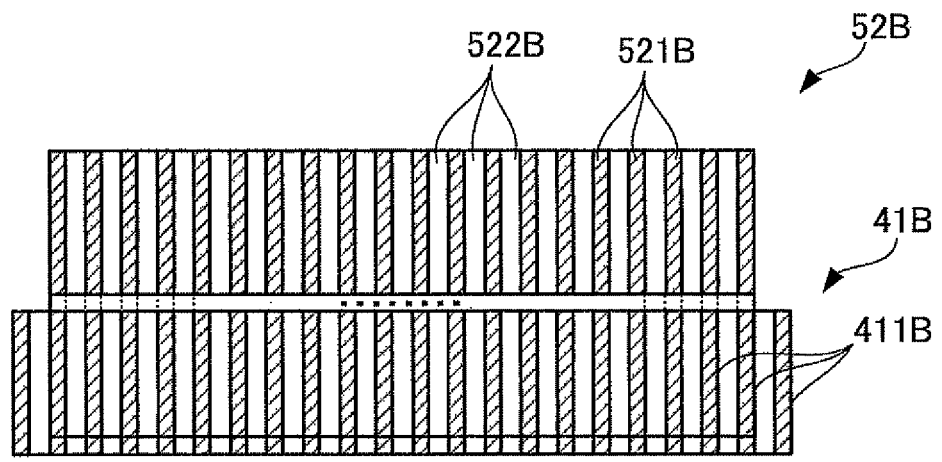
FIG. 11 is a cross sectional diagram taken along XI-XI dashed-dotted arrows of FIG. 10.

Next, a second modification is described with reference to FIGS. 9 through 11. In order to indicate that the diagram of FIGS. 9 to 11 illustrate the second modification of the aforementioned embodiment, same reference numerals used in the embodiment are provided with a suffix "B" in FIGS. 9 to 11.

Figure 9:
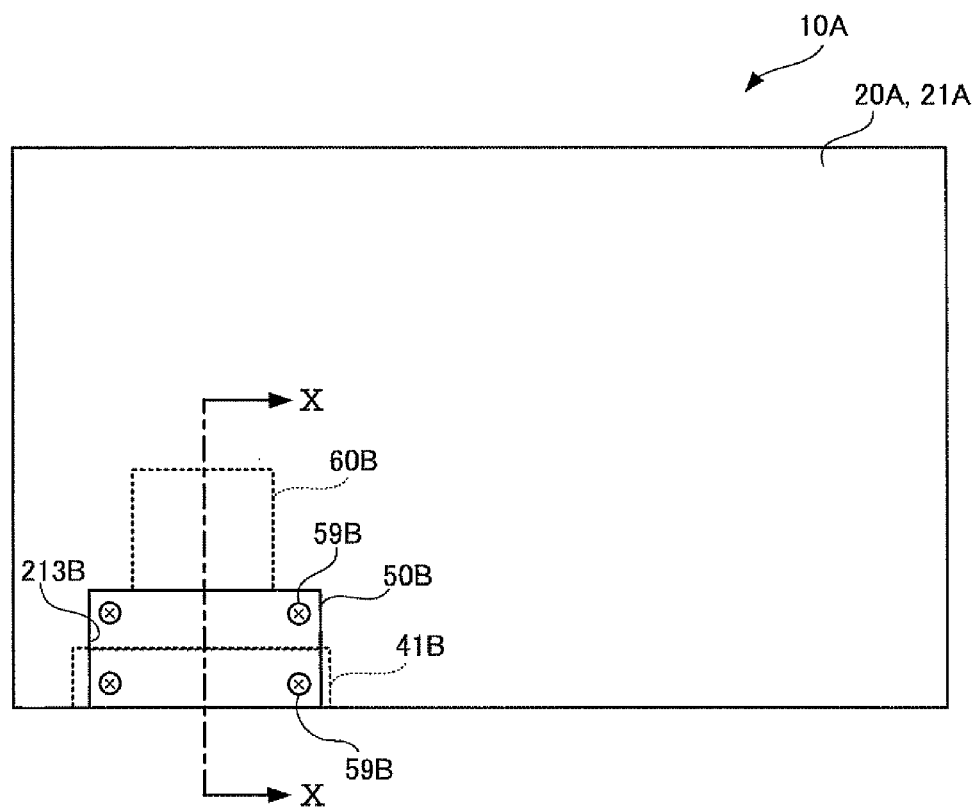
FIG. 9 is a schematic diagram illustrating a bottom face of a main body unit of a note PC.

FIG. 9 is a schematic diagram illustrating a bottom face of a main body unit of a note PC, which corresponds to FIG. 2 of the aforementioned embodiment. FIG. 10 is a cross sectional diagram taken along X-X dashed-dotted arrows of FIG. 9, which corresponds to FIG. 3 of the aforementioned embodiment. FIG. 11 is a cross sectional diagram taken along XI-XI dashed-dotted arrows of FIG. 10, which corresponds to FIG. 4 of the aforementioned embodiment.

In the aforementioned embodiment, the dust filter 50 includes a cover part 51 unoverlapping with the radiation fins 41 as illustrated in FIGS. 2 and 3. By contrast, a dust filter 50B includes a cover part 51B overlapping with radiation fins 41B as illustrated in FIGS. 9 and 10. Accordingly, a filter part 52B of the dust filter 50B is located closer to the radiation fins 41B as illustrated in FIGS. 10 and 11. Further, a fan 60B of the dust filter 50B is also located closer to the radiation fins 41B as illustrated in FIGS. 9 and 10. With this configuration, the air sent from the fan 60B may be allowed to pass through the radiation fins 41B with lower loss, which may improve radiating efficiency. Further, the size of the space for accommodating the dust filter 50B within the case 21A may be reduced, which may contribute to downsizing of the device.

According to the disclosures herein, an electronic device includes a dust filter capable of inhibiting dust from accumulating in radiation fins in a normal usage status and optionally eliminating the dust accumulated inside the radiation fins.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:
1. An electronic device, comprising:
a case having an exhaust vent;
an electronic component disposed inside the case;
a radiation component including radiation fins that are disposed at a position adjacent to the exhaust vent inside the case and that are formed of first plates disposed parallel to one another so as to form first air channels partitioned by the first plates, the radiation component receives heat of the electronic component and radiates the received heat to air passing through the first air channels of the radiation fins;
a fan disposed at a position having a space from the radiation fins inside the case, the fan sends air toward the radiation fins;
a dust filter including second plates disposed parallel to one another so as to form second air channels partitioned by the second plates and disposed in the space between the radiation fins and the fan, the dust filter transfers the air sent from the fan to the radiation fins while capturing dust contained in the transferred air,
wherein the dust filter disposed in the space is removable from the space, and
wherein the second plates of the dust filter have a shape that pushes out the dust accumulated in the first air channels from the first air channels when the second plates are inserted in-between the radiation fins in the first air channels in a direction parallel to the first air channels.

2. The electronic device as claimed in claim 1, wherein the case includes an opening communicating with the space, and the dust filter serves as a cover to block the opening.

3. The electronic device as claimed in claim 1, wherein the second plates are formed such that thicknesses of the second plates gradually become thinner toward pointed ends of the second plates to be inserted into the first air channels of the radiation fins.

4. The electronic device as claimed in claim 2, wherein the second plates are formed such that thicknesses of the second plates gradually become thinner toward pointed ends of the second plates to be inserted into the first air channels of the radiation fins.

5. The electronic device as claimed in claim 1, further comprising
a second case having a display screen that displays an image, the second case being coupled to the case such that the second case is opened or closed with respect to the case, wherein
the case includes a keyboard on an upper surface of the case and an electronic component having an arithmetic function inside the case.

6. The electronic device as claimed in claim 2, further comprising
a second case having a display screen that displays an image, the second case being coupled to the case such that the second case is opened or closed with respect to the case, wherein
the case includes a keyboard on an upper surface of the case and an electronic component having an arithmetic function inside the case.

7. The electronic device as claimed in claim 3, further comprising
a second case having a display screen that displays an image, the second case being coupled to the case such that the second case is opened or closed with respect to the case, wherein
the case includes a keyboard on an upper surface of the case and an electronic component having an arithmetic function inside the case.

8. The electronic device as claimed in claim 4, further comprising
   a second case having a display screen that displays an image, the second case being coupled to the case such that the second case is opened or closed with respect to the case, wherein
   the case includes a keyboard on an upper surface of the case and an electronic component having an arithmetic function inside the case.

* * * * *